(12) United States Patent
Huang (10) Patent No.: US 9,110,549 B2
(45) Date of Patent: *Aug. 18, 2015

(54) DRIVING FREQUENCY SELECTION METHOD FOR CAPACITIVE MULTI-TOUCH SYSTEM

(71) Applicant: ORISE TECHNOLOGY CO., LTD., Hsinchu (TW)

(72) Inventor: Hsin-Mao Huang, Hsinchu (TW)

(73) Assignee: ORISE TECHNOLOGY CO., LTD., Hsinchu (TW)

( * ) Notice: Subject to any disclaimer, the term of this patent is extended or adjusted under 35 U.S.C. 154(b) by 245 days.

This patent is subject to a terminal disclaimer.

(21) Appl. No.: 13/788,100

(22) Filed: Mar. 7, 2013

(65) Prior Publication Data
US 2013/0234985 A1    Sep. 12, 2013

(30) Foreign Application Priority Data
Mar. 9, 2012 (TW) .............................. 101108098 A (51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................................ G06F 3/0418; G06F 3/044

USPC ................................................... 345/173–179
See application file for complete search history.

(56) References Cited

U.S. PATENT DOCUMENTS

| | | | |
|---|---|---|---|
| 7,643,011 B2 * | 1/2010 | O'Connor et al. ............. | 345/173 |
| 2008/0162996 A1 * | 7/2008 | Krah et al. ....................... | 714/27 |
| 2009/0244031 A1 * | 10/2009 | Westerman et al. ........... | 345/174 |
| 2012/0050206 A1 * | 3/2012 | Welland ......................... | 345/174 |
| 2012/0054379 A1 * | 3/2012 | Leung et al. ..................... | 710/23 |
| 2012/0068964 A1 * | 3/2012 | Wright et al. .................. | 345/174 |
| 2013/0154982 A1 * | 6/2013 | Hotelling et al. .............. | 345/173 |
| 2013/0265276 A1 * | 10/2013 | Obeidat et al. ................. | 345/174 |

* cited by examiner

*Primary Examiner* — Amare Mengistu
*Assistant Examiner* — Jennifer Zubajlo
(74) *Attorney, Agent, or Firm* — Bacon & Thomas, PLLC (57) ABSTRACT

A driving frequency selection method is used in a capacitive multi-touch system. When the system operates in an idle mode, an active driving frequency is selected randomly from N candidates, and a self-capacitance driving and sensing is used to detect touch points. When there are touch points, the capacitive multi-touch system is switched to an active mode to acquire an image raw data for finding the positions of touch points. In the active mode, noise is calculated from the image raw data. When the noise exceeds a predetermined value, the system is switched back to the idle mode, and the self-capacitance driving and sensing is applied to N−1 active driving frequencies other than the previously selected active driving frequency to acquire N−1 self-capacitance image raw data. The method determines one with a minimum noise and selects the corresponding frequency as a currently active driving frequency.

12 Claims, 8 Drawing Sheets

Produce a first trigger signal Trigger1 as $| P_{SCIRD}(i) - P_{SCBIRD}(i) | > Th1$ — (F1)

DRIVING FREQUENCY SELECTION METHOD FOR CAPACITIVE MULTI-TOUCH SYSTEM

CROSS REFERENCE TO RELATED APPLICATION

This application claims the benefits of the Taiwan Patent Application Serial Number 101108098, filed on Mar. 3, 2012, the subject matter of which is incorporated herein by reference.

BACKGROUND OF THE INVENTION

1. Field of the Invention

The present invention relates to the technical field of touch panels and, more particularly, to a driving frequency selection method for capacitive multi-touch system.

2. Description of Related Art

The principle of touch panels is based on different sensing manners to detect a voltage, current, acoustic wave, or infrared to thereby detect the coordinate of a touch point on a screen as touched by a finger or other medium. For example, a resistive touch panel uses a potential difference between the upper and lower electrodes to compute the position of a pressed point for detecting the location of the touch point, and a capacitive touch panel uses a capacitance change generated in an electrostatic combination of the arranged transparent electrodes with the touching part of a human body to generate a current or voltage for detecting the coordinate of the touching part.

Upon the principle, the capacitive touch technologies can be divided into a surface capacitive and a projected capacitive sensing. The surface capacitive sensing has a simple configuration, so that the multi-touch implementation is not easy, and the problems of electromagnetic disturbance (EMI) and noises are difficult to be overcome. Therefore, the popular trend of capacitive touch development is toward the projected capacitive sensing.

The projected capacitive sensing can be divided into a self capacitance and a mutual capacitance sensing. The self capacitance sensing indicates that a capacitance coupling is generated between a touch object and a conductor line, and a touch occurrence is decided by measuring a capacitance change of the conductor line. The mutual capacitance sensing indicates that a capacitance coupling is generated between two adjacent conductor lines when a touch occurs.

Figure 1:
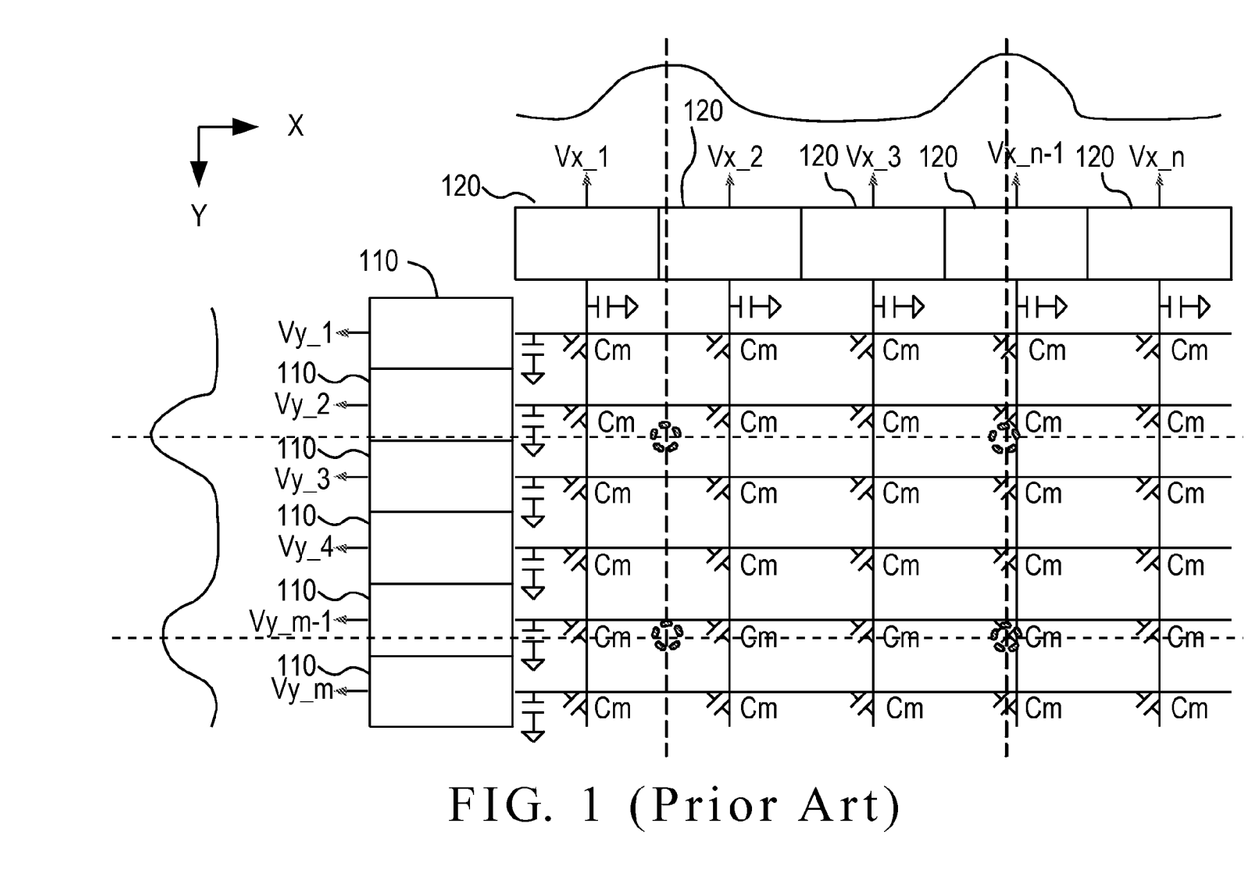
FIG. 1 is a schematic diagram of a typical self capacitance sensing.

A typical self capacitance sensing senses the grounded capacitance on every conductor line. Thus, a change of the grounded capacitance is used to determine whether an object is toward the capacitive touch panel. The self capacitance or the grounded capacitance is not a physical capacitor, but parasitic and stray capacitance on every conductor line. FIG. 1 is a schematic view of a typical self capacitance sensing. As shown in FIG. 1, at the first time interval, the driving and sensing devices 110 in a first direction drive the conductor lines in the first direction in order to further charge the self capacitance of the conductor lines in the first direction. At the second period, the driving and sensing devices 110 sense the voltages on the conductor lines in the first direction. At the third period, the driving and sensing devices 120 in a second direction drive the conductor lines in the second direction in order to further charge the self capacitance of the conductor lines in the second direction. At the fourth period, the driving and sensing devices 120 sense the voltages on the conductor lines in the second direction.

The typical self capacitance sensing of FIG. 1 connects both a driver circuit and a sensor circuit on the same conductor line in order to drive the conductor line and sense a signal change on the same conductor line to thereby decide a magnitude of the self capacitance. In this case, the advantages include:

(1) a reduced amount of data since the typical touch panel has m+n data in a single image only, so as to save the hardware cost;

(2) a reduced time required for sensing a touch point since an image raw data can be quickly fetched due to only two sensing operations, i.e., concurrently (or one-by-one) sensing all the conductor lines in the first direction first and then in the second direction, for completing a frame, as well as a relatively reduced time required for converting a sensed signal from analog into digital; and (3) a lower power consumption due to the reduced amount of data to be processed.

However, such a self capacitance sensing also has the disadvantages as follows:

(1) When there is a floating conductor, such as a water drop, an oil stain, and the like, on the touch panel, it causes an error decision on a touch point.

(2) When there are multiple touch points concurrently on the touch panel, it causes a ghost point effect, so that such a self capacitance sensing cannot be used in multi-touch applications.

Figure 2:
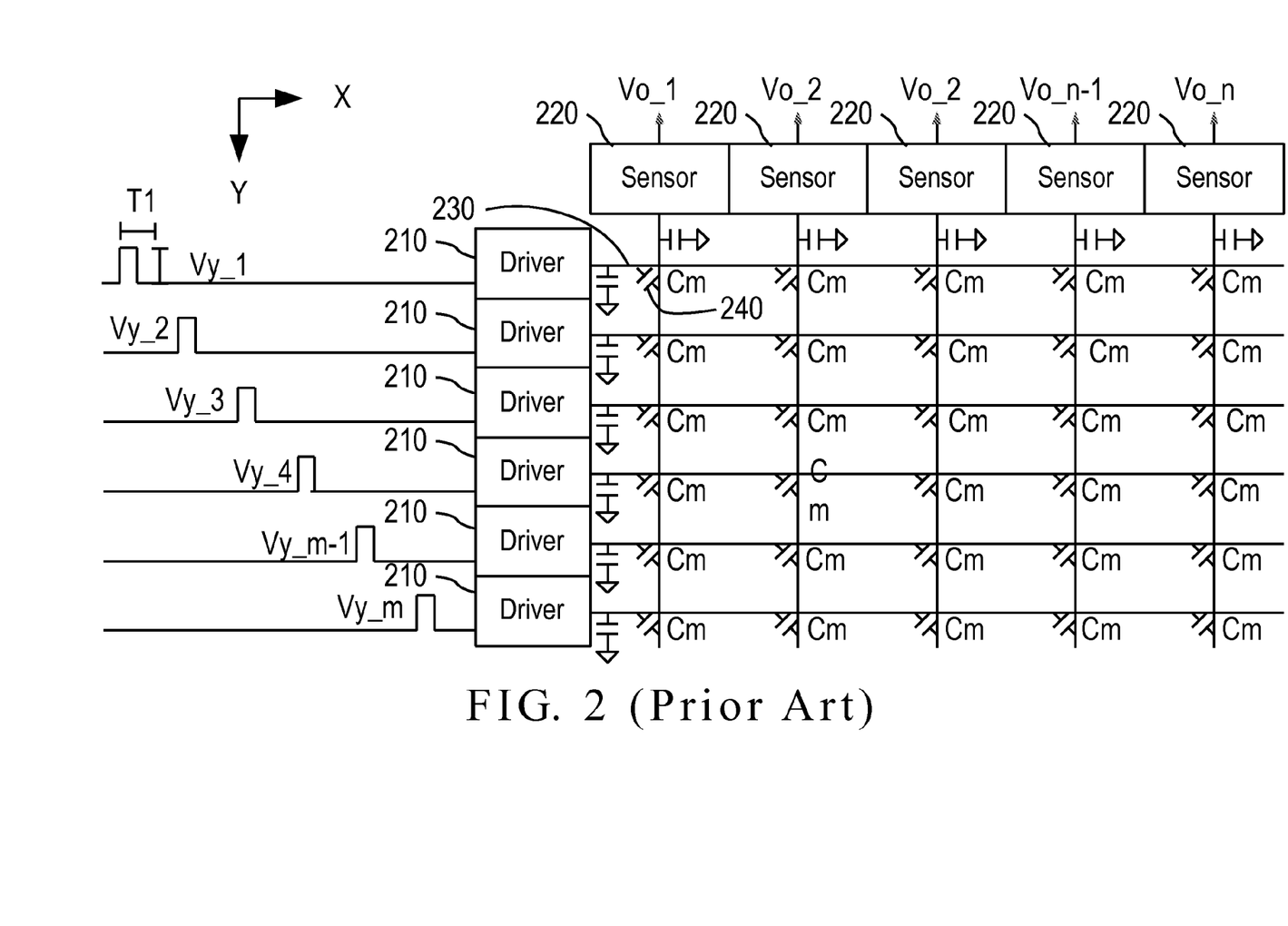
FIG. 2 is a schematic diagram of a typical mutual capacitance sensing.

Another way of driving the typical capacitive touch panel is to sense a magnitude change of mutual capacitance Cm to thereby determine whether an object is toward the touch panel. Likewise, the mutual capacitance Cm is not a physical capacitor but a mutual capacitance between the conductor lines in the first direction and in the second direction. FIG. 2 is a schematic diagram of a typical mutual capacitance sensing. As shown in FIG. 2, the drivers 210 are located on the first direction (Y), and the sensors 220 are located on the second direction (X). At the upper half of the first time interval T1, the drivers 210 drive the conductor lines 230 in the first direction and use the voltage Vy_1 to charge the mutual capacitance (Cm) 250, and at the lower half, all sensors 220 sense voltages (Vo_1, Vo_2, . . . , Vo_n) on the conductor lines 240 in the second direction to thereby obtain n data. Accordingly, the m×n data can be obtained after m driving periods.

Such a mutual capacitance sensing has the advantages as follows:

(1) It is easily determined whether a touch is generated from a human body since a signal generated from a floating conductor is in a different direction than a grounded conductor.

(2) Every touch point is indicated by a real coordinate, and the real position of each point can be found when multiple points are concurrently touched, so that such a mutual capacitance sensing can easily support the multi-touch applications.

Also, there are some disadvantages as follows:

(1) A single image raw data has an amount of n×m, which is relatively higher than the amount under the self capacitance sensing.

(2) A one-by-one scanning is operated in a selected direction. For example, when there are 20 conductor lines in the first direction (Y), the sensing operation is performed 20 times for obtaining a complete image raw data. Also, due to the large amount of data, the time required for converting a sensed signal from analog into digit is relatively increased.

(3) Due to the large amount of data, the power consumption is thus increased on data processing.

Whether the self or the mutual capacitance operation is used, the driving and sensing devices 110 and drivers 210 all require producing separate stimulus waves to drive the conductor lines. The stimulus waves have a specific frequency. However, noises can easily interfere with the stimulus waves, so that the errors appear on sensing a signal and on determining the position when the capacitive touch panel is touched. Thus, the sensing resolution of the capacitive touch panel is affected.

To overcome this, in the U.S. Pat. No. 7,643,011, three stimulus waves, each having a different driving frequency, are output by a manner of mutual capacitance, so as to responsively obtain three touch images, and one with the minimum noise is selected from the three touch images. Thus, the driving frequency corresponding to the touch image with the minimum noise is selected as the active frequency for extracting the touch image and calculating the coordinate or position. However, the prior art obviously requires three touch images, which triples the power, the time, and the data amount processing.

Therefore, it is desirable to provide an improved driving frequency selection method for capacitive multi-touch system to mitigate and/or obviate the aforementioned problems.

SUMMARY OF THE INVENTION

The object of the present invention is to provide a driving frequency selection method for capacitive multi-touch system, which can reduce the power consumption and be used in a portable device to prolong its use life. Also, the invention can overcome the problem of affecting the touch report rate caused by the large data amount in the prior art.

To achieve the object, a driving frequency selection method used in a capacitive multi-touch system is provided, which is used in a capacitive multi-touch system. The system includes a capacitive touch panel, a first driving and sensing device, a second driving and sensing device, and a controller. The first and the second driving and sensing devices each have an idle mode and an active mode. Each of the idle mode and the active mode in either the first and the second driving or sensing devices has N driving frequencies, where N is a positive integer greater than one. When the first and the second driving and sensing devices operate in the idle mode, a self capacitance driving and sensing is performed. When the first and the second driving and sensing devices operate in the active mode, a mutual capacitance driving and sensing is performed. The method includes: (A) using the controller to initialize the first and the second driving and sensing devices; (B) using the controller to configure the first and the second driving and sensing devices into the active mode, and sequentially using the N driving frequencies to sense the capacitive touch panel to produce N mutual capacitance base image raw data and store them in the storage unit; (C) configuring the first and the second driving and sensing devices into the idle mode, and sequentially using the N driving frequencies to sense the capacitive touch panel to produce N self capacitance base image raw data and store them in the storage unit; (D) selecting one of the N driving frequencies as an active driving frequency; (E) using the active driving frequency to sense the capacitive touch panel to produce a self capacitance image raw data and store it in the storage unit; (F) detecting a touch point on the capacitive touch panel according to the self capacitance image raw data and the self capacitance base image raw data, and executing step (G) when the touch point exists on the capacitive touch panel; (G) configuring the first and the second driving and sensing devices into the active mode, and sensing the capacitive touch panel based on the active driving frequency to produce a mutual capacitance image raw data and store it in the storage unit; (H) detecting a noise on the capacitive touch panel according to the mutual capacitance image raw data, and executing step (I) when there is no noise on the capacitive touch panel; and (I) calculating a coordinate of the touch point on the capacitive touch panel according to the mutual capacitance image raw data and the mutual capacitance base image raw data.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
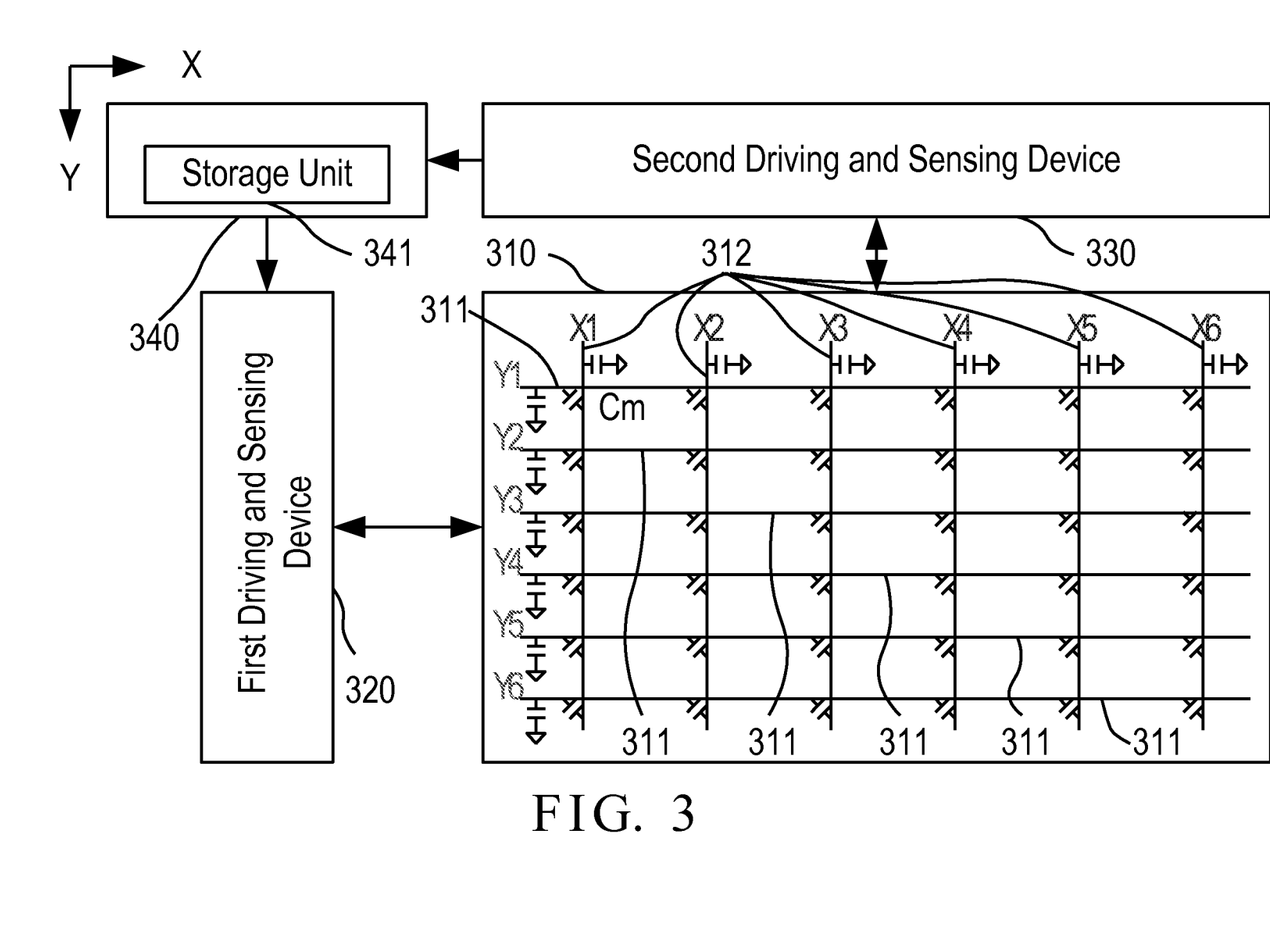
FIG. 3 is a block diagram of a capacitive multi-touch system with a capacitive touch panel that applies a driving frequency selection method for capacitive multi-touch systems according to the invention.

The invention provides a driving frequency selection method for capacitive multi-touch systems, which is used in a capacitive multi-touch system 300. FIG. 3 is a block diagram of the capacitive multi-touch system 300. The system 300 includes a capacitive touch panel 310, a first driving and sensing device 320, a second driving and sensing device 330, and a controller 340.

The first driving and sensing device 320 and the second driving and sensing device 330 have an idle mode and an active mode respectively. The first driving and sensing device 320 and the second driving and sensing device 330 each have N driving frequencies in either the idle mode or the active mode, where N is a positive integer greater than one. In this embodiment, N=3 for convenient description.

When the first driving and sensing device 320 and the second driving and sensing device 330 operate in the idle mode, a self capacitance driving and sensing is performed. When the first driving and sensing device 320 and the second driving and sensing device 330 operate in the active mode, a mutual capacitance driving and sensing is performed. The controller 340 has a storage unit 341.

The capacitive touch panel 310 has a plurality of first conductor lines 311 (Y1-Y6) in a first direction (Y) and a plurality of second conductor lines 312 (X1-X6) in a second direction (X). The first direction (Y) is vertical to the second direction (X).

Figure 4:
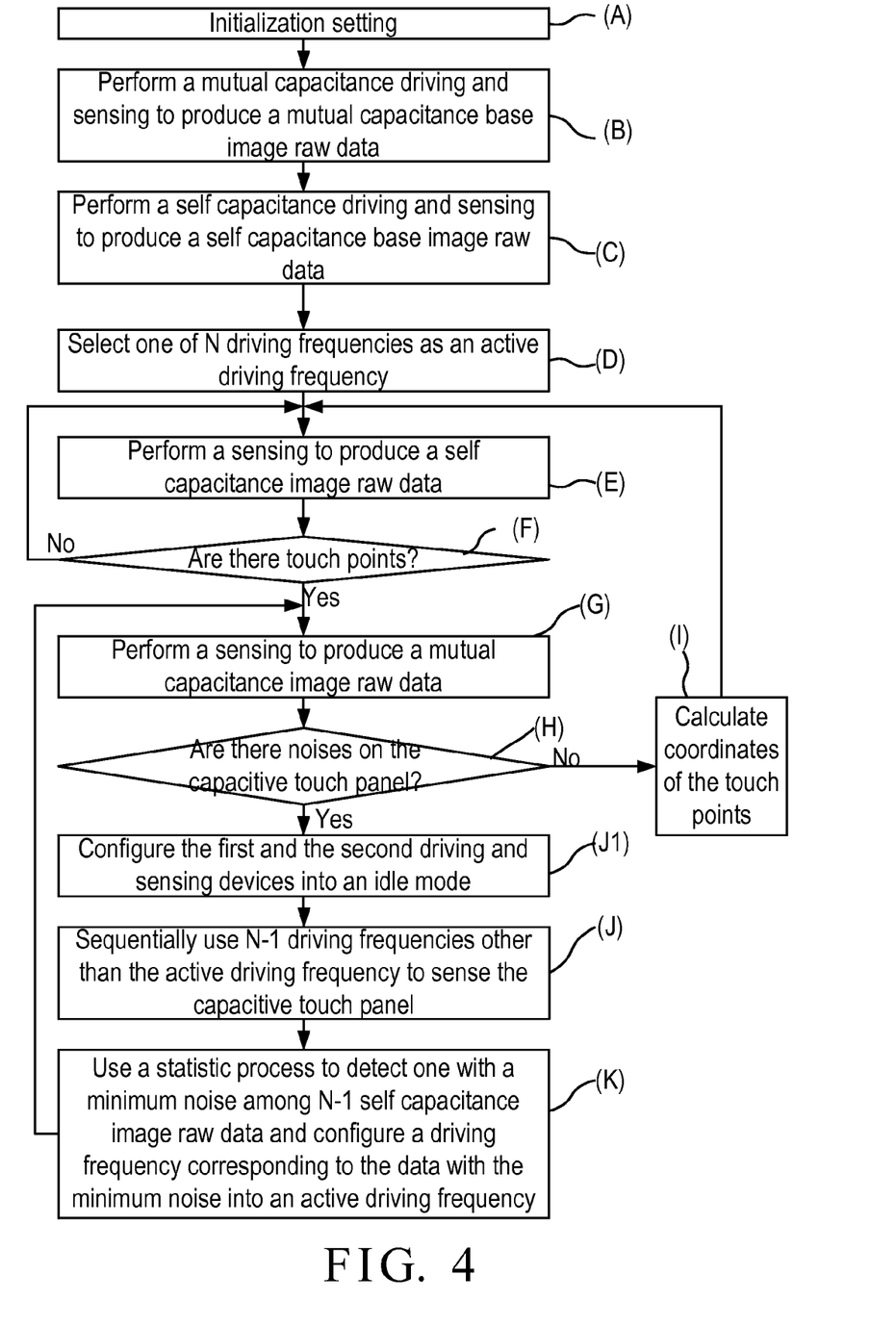
FIG. 4 is a flowchart of a driving frequency selection method for capacitive multi-touch systems according to the invention.

FIG. 4 is a flowchart of a driving frequency selection method for capacitive multi-touch systems according to the invention. First, in step (A), the controller 340 initializes the first and the second driving and sensing devices 320 and 330. The first and the second driving and sensing devices 320 and 330 are initialized in the mutual capacitance driving and sensing to thereby configure the parameter settings of a driving wave including its number, frequency, pattern, and the like.

In step (B), the controller 340 configures the first and the second driving and sensing devices 320 and 330 into the active mode, and sequentially uses three driving frequencies to sense the capacitive touch panel to thereby produce three mutual capacitance base image raw data (MCBIRD) and store them in the storage unit 341. For a further description, the controller 340 essentially utilizes a short time interval, i,e., the system is powered on at early and a user does not touch the capacitive touch panel 310, to perform a mutual capacitance driving and sensing on the capacitive touch panel to thereby produce the MCBIRD data and store the MCBIRD data in the storage unit 341 for a reference and comparison use in subsequently performing a mutual capacitance driving and sensing.

In step (C), the controller 340 configures the first and the second driving and sensing devices 320 and 330 into the idle mode, and sequentially uses N driving frequencies to sense the capacitive touch panel to thereby produce N self capacitance base image raw data (SCBIRD) and store them in the storage unit 341. The controller 340 essentially utilizes a short time interval, i,e., when the system is powered on at early and a user does not touch the capacitive touch panel 310, to perform a self capacitance driving and sensing on the capacitive touch panel to thereby produce the SCBIRD data and store the SCBIRD data in the storage unit 341 for a reference and comparison use in subsequently performing a self capacitance driving and sensing.

In step (D), one of three driving frequencies is randomly selected as an active driving frequency. In this embodiment, the three driving frequencies are 100 KHz, 150 KHz, and 200 KHz, and the controller 340 selects the 100 KHz driving frequency as the active driving frequency.

In step (E), the active driving frequency is used to sense the capacitive touch panel 310 to thereby produce a self capacitance image raw data (SCIRD) and store the SCIRD data in the storage unit 341.

The operation performed in step (E) is similar to step (C) in which the self capacitance driving and sensing is used to obtain a raw data of the capacitive touch panel 310, except that the SCIBD data obtained in step (E) is stored in a different space of the storage unit 341 than the SCBIRD data for a subsequent decision and use.

For a further description, step (F) is based on the SCIRD data and the SCBIRD data to determine whether there is a touch point on the capacitive touch panel. If yes, step (G) is executed, and otherwise, i.e., when there is no touch point on the capacitive touch panel, step (E) is executed to enter the capacitive multi-touch system 300 into the idle mode.

In step (F), the controller 340 is based on the SCIRD data and the SCBIRD data to determine whether there is a touch point on the capacitive touch panel 310. If yes, step (G) is executed.

In step (F), the controller 340 compares the SCIRD data and the SCBIRD data to determine whether a self capacitance of the capacitive touch panel 310 is changed. Namely, it is determined whether the self capacitance at every first conductor line 311 (Y1-Y6) and every second conductor line 312 (X1-X6) on the capacitive touch panel 310 is changed.

Step (F) compares the SCIRD data obtained in step (E) and the SCBIRD data obtained in step (C) to thereby determine whether the difference is over a first threshold. The first threshold can be modified as required for the design of the capacitive multi-touch system 300, and changed with a change of the SCBIRD data. Namely, the SCIRD data obtained in step (E) and the SCBIRD data obtained in step (C) have a difference, which can exceed the first threshold even the value is small, to thereby determine that the user touches the capacitive touch panel 310 in step (E), so that a next step triggers the mutual capacitance driving and sensing to perform a coordinate transform operation. Briefly, when the difference is over the first threshold, it is determined that there is a touch point on the capacitive touch panel 310. Conversely, when the difference is not over the first threshold, it indicates that no user touches the capacitive touch panel, so that the self capacitance driving and sensing is performed, and step (E) is executed.

Figure 5:
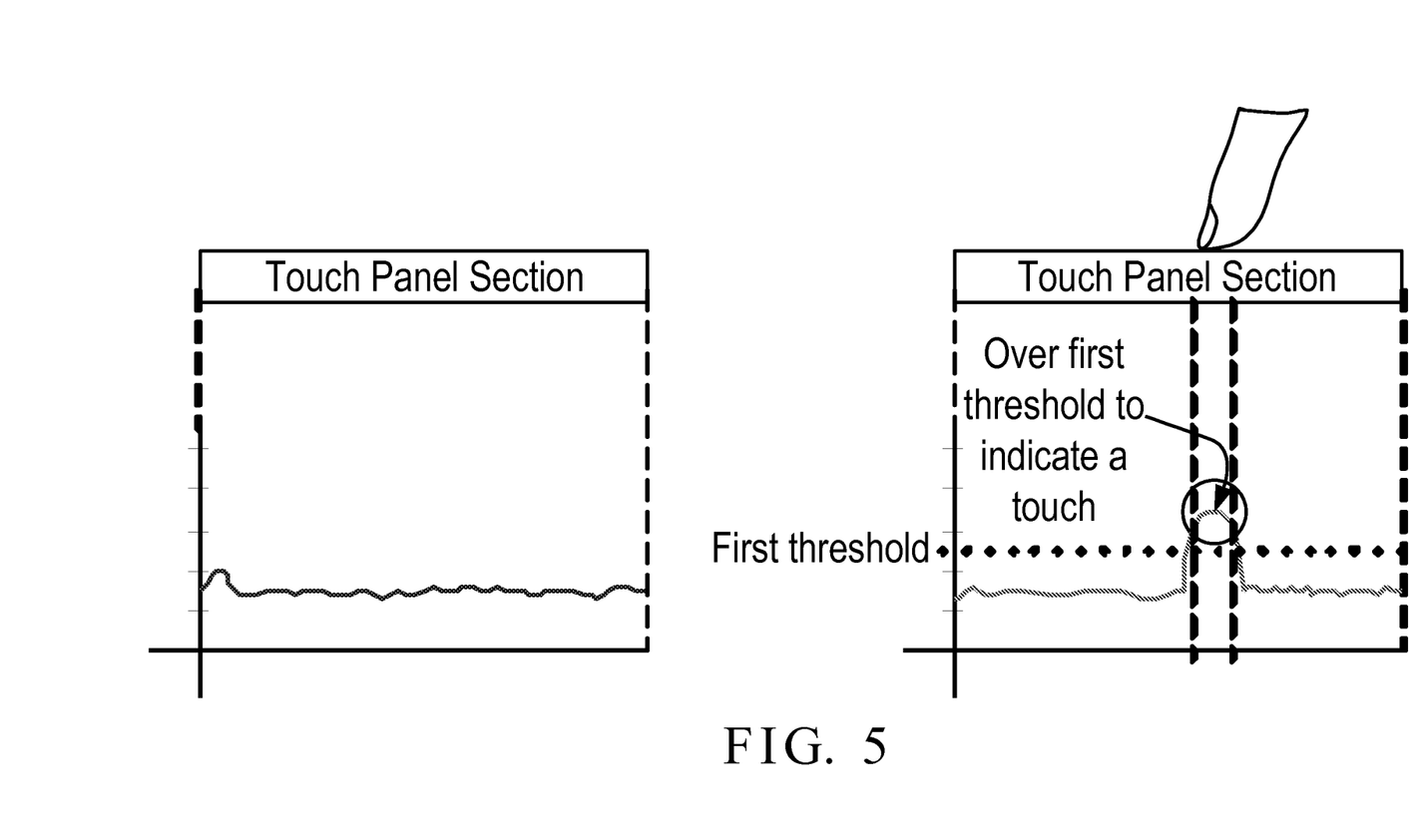
FIG. 5 is a schematic diagram of a threshold for determining whether a touch exists in a self capacitance driving and sensing according to the invention.

FIG. 5 is a schematic diagram of a threshold for determining whether a touch exists in a self capacitance driving and sensing according to the invention. As shown in FIG. 5, the circle indicates the SCIRD data and the SCBIRD data have a difference over the first threshold to thereby determine that the user touches the capacitive touch panel 310.

Figure 6:
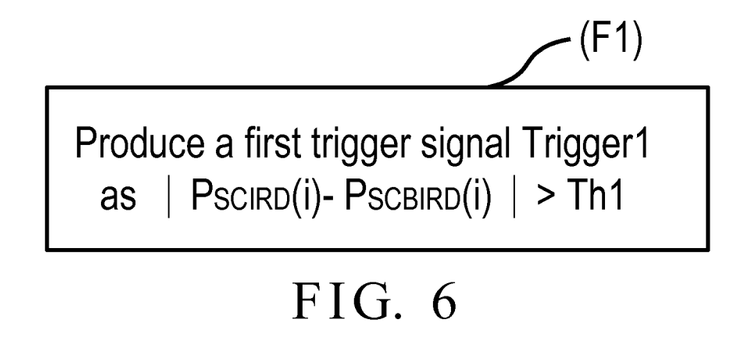
FIG. 6 is a flowchart of determining whether a touch point exists in a self capacitance driving and sensing according to the invention.

In other embodiments, step (F) can determine whether there is a touch point as follows. FIG. 6 is a flowchart of determining whether a touch point exists in a self capacitance driving and sensing according to the invention.

In step (F1), when an absolute value of the difference of $P_{SCIRD}(i)$ and $P_{SCBIRD}(i)$ is greater than a first predetermined value Th1, a first trigger signal Trigger1 is produced, where i indicates a data range covered by the SCIRD data and the SCBIRD) data, $P_{SCIRD}(i)$ indicates a value of the SCIRD data, and $P_{SCBIRD}(i)$ indicates a value of the SCBIRD data.

The capacitive touch panel 310 has m first conductor lines 311 (Y1-Y6) in the first direction (Y) and n second conductor lines 312 (X1-X6) in the second direction (X), so that the SCIRD data and the SCBIRD data have a data amount of m+n, where i ranges from 0 to (m+n−1).

When the absolute value of the difference of $P_{SCIRD}(i)$ and $P_{SCBIRD}(i)$ is greater than the first predetermined value Th1, it indicates that the self capacitance of corresponding conductor lines is changed; i.e., the user touches the capacitive touch panel 310 to thus produce the first trigger signal Trigger1 to indicate that one or more touch points exist on the capacitive touch panel 310.

In step (G), the controller 340 configures the first and the second driving and sensing devices 320 and 330 into the active mode and is based on the active driving frequency in step (E) to sense the capacitive touch panel 310 to thereby produce a mutual capacitance image raw data (MCIRD) and store the MCIRD data in the storage unit 341.

The operation performed in step (G) is similar to step (B) in which the mutual capacitance driving and sensing is used to obtain a raw data of the capacitive touch panel 310, except that the MCIBD data obtained in step (G) is stored in a different space of the storage unit 341 than the MCBIRD data for a subsequent decision and use. In addition, when the process enters into step (G), it indicates that the capacitive multi-touch system 300 also enters into the active/normal mode.

Step (H) is based on the MCIRD data to determine whether there is a noise on the capacitive touch panel 310. If yes, step (I) is executed.

In step (H), the controller 340 compares the MCBIRD data and the MCIRD data to determine whether a noise exists on the capacitive touch panel 310. Since one of the three driving frequencies in step (D) is randomly selected as an active driving frequency, three driving frequencies are required for sensing the capacitive touch panel in step (B) to thereby produce three MCBIRD data for the comparison.

Figure 7:
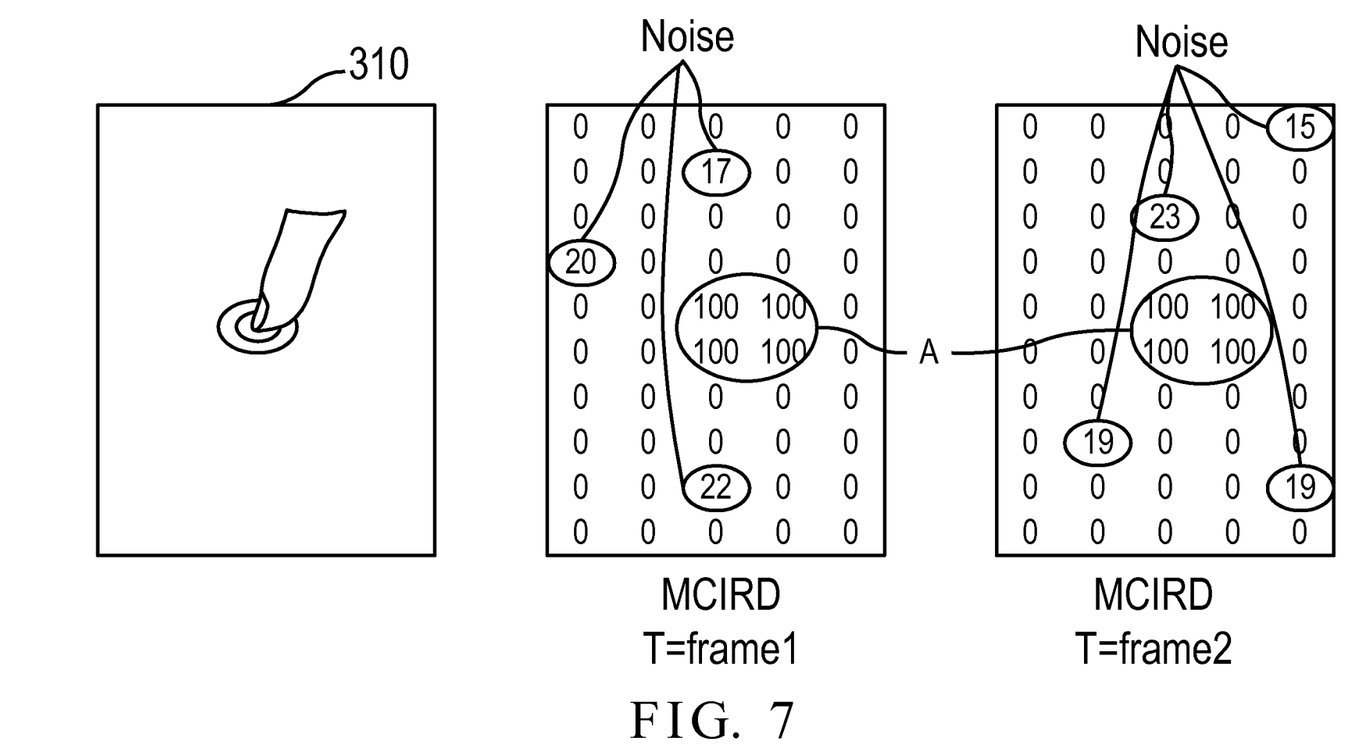
FIG. 7 is a schematic diagram of determining whether noises exist in a mutual capacitance driving and sensing according to the invention.

FIG. 7 is a schematic diagram of determining whether a noise exists in a mutual capacitance driving and sensing according to the invention. As shown in FIG. 7, when the first and the second driving and sensing devices 320 and 330 perform a sensing, the required operation time is much lower than the time required for the action of a human finger. In this case, on touching, the MCIRD data has corresponding touch data at time T=frame1 and T=frame2, as shown in the circle A of FIG. 7. When the MCIRD data is at time T=frame1 and T=frame2, it is not easy that a noise appears in the same position. Upon such a feature, it is determined whether a noise exists on the capacitive touch panel 310.

Figure 8:
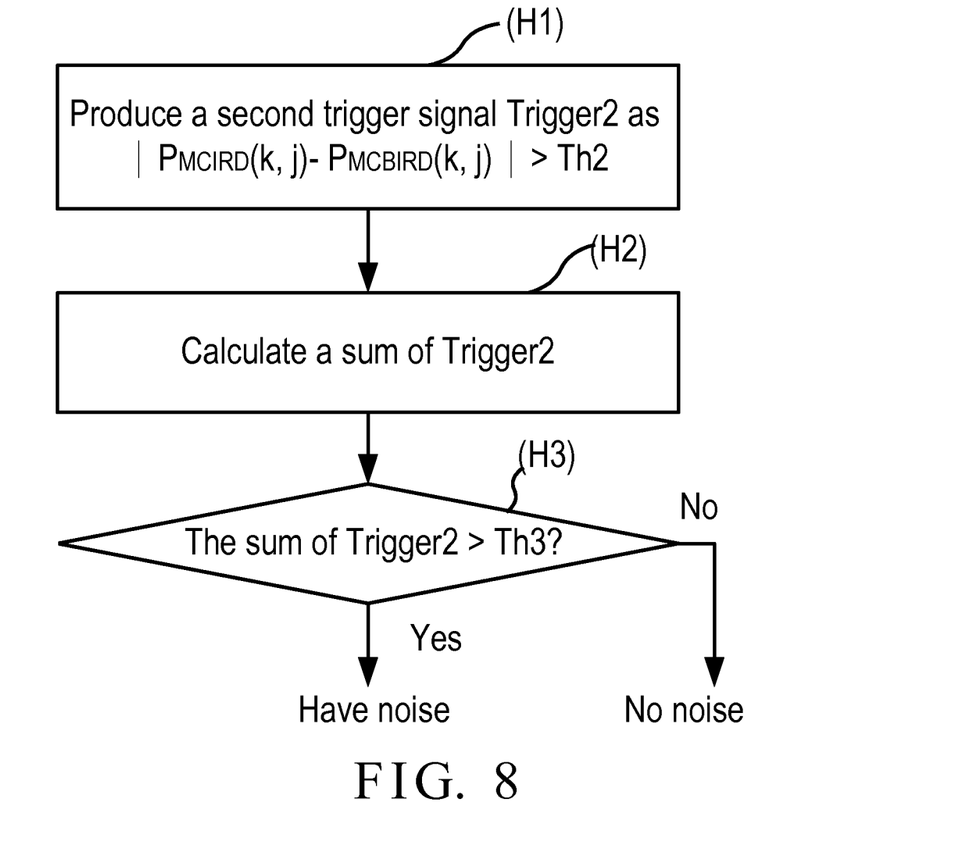
FIG. 8 is a flowchart of determining whether noises exist in a mutual capacitance driving and sensing according to the invention.

Step (H) can determine whether there is a noise as follows. FIG. 8 is a flowchart of determining whether a noise exists in a mutual capacitance driving and sensing according to the invention.

In step (H1), when an absolute value of the difference of $P_{MCIRD}(k, j)$ and $P_{MCBIRD}(k, j)$ is greater than a second predetermined value Th2, a second trigger signal Trigger2 is produced, where k, j indicate an image range covered by the MCIRD data and the MCBIRD data, $P_{MCIRD}(k, j)$ indicates a value of the mutual capacitance image raw data, and $P_{MCBIRD}(k, j)$ indicates a value of the mutual capacitance base image raw data.

The capacitive touch panel 310 has m first conductor lines 311 (Y1-Y6) in the first direction (Y) and n second conductor lines 312 (X1-X6) in the second direction (X), so that the MCIRD data and the MCBIRD data have a data amount of m+n, where k ranges from 0 to (m−1) and j ranges from 0 to (n−1).

When the absolute value of the difference of $P_{MCIRD}(k, j)$ and $P_{MCBIRD}(k, j)$ is greater than the second predetermined value Th2, it indicates the corresponding position possibly is affected by the noise.

Step (H2) calculates a sum of the second trigger signals Trigger2.

In step (H3), when the sum of the second trigger signals Trigger2 is greater than a third predetermined Th3, it indicates that the noise appears at many sensed positions, so that the controller 340 determines that there are noises on the capacitive touch panel 310.

In other embodiments, in step (H), the controller 340 is based on whether an MCIRD data is greater than the first and second thresholds to thereby determine whether there is a noise on the capacitive touch panel. Namely, when the value of the MCIRD data is greater than the first threshold and the sum is greater than the second threshold, the controller 340 determines that there is a noise on the capacitive touch panel 310.

In step (I), when the controller 340 determines that there is no noise or the noise amount is too small, it is based on the mutual capacitance image raw data and the mutual capacitance base image raw data to calculate the coordinate of the touch point on the capacitive touch panel, and the process returns to step (E).

In step (H), when the controller 340 determines that there is a noise on the capacitive touch panel, it indicates that the 100 KHz selected in step (D) is easily affected by the noise, so that the controller 340 in step (J1) configures the first and the second driving and sensing devices 320 and 330 into the idle mode and sequentially uses the N−1 driving frequencies other than the active driving frequency in step (J) in order to sense the capacitive touch panel 310 to thereby produce the N−1 self capacitance image raw data and store them in the storage unit 341.

In step (J1), the first and the second driving and sensing devices 320 and 330 are switched first to the idle mode, so that the data amount of (N−1)×(m+n) is acquired. If the first and the second driving and sensing devices 320 and 330 in step (J) are not switched to the idle mode, the data amount of (N−1)×(m×n) is acquired, which is much greater than (N−1)×(m+n).

In step (K), the controller 340 uses a statistic process to find one with the minimum noise among the N−1 self capacitance image raw data and configures the driving frequency corresponding to the self capacitance image raw data with the minimum noise into the active driving frequency, and subsequently step (G) is executed. In addition, the controller 340 in step (K) can use a filtering process to find the self capacitance image raw data with the minimum noise.

As cited, it is known that the prior art requires at least (N−1)×(m×n) data amount to be processed before the active frequency is determined and selected. On the contrast, the invention requires processing the (N−1)×(m+n) data only. Therefore, the invention can allow the multi-touch system to find the active driving frequency in a faster and more power saving way than the prior art.

The invention outputs multiple driving frequencies in the idle mode to thereby find the most pure frequency as the active driving frequency and subsequently obtains a 2D image raw data in the active mode for a coordinate computation.

The invention performs a self capacitance driving and sensing in the idle mode. Only the 1D data amount in the first and second directions (Y) and (X) is obtained each time, so that the power consumption is lower, and one of the driving frequencies can be quickly determined to be the active driving frequency. Since the active driving frequency is determined, the idle mode is changed into the active mode in order to perform a mutual capacitance driving and sensing and obtain a set of touch images to thereby calculate the coordinate or position of the touch point corresponding to the active driving frequency. However, the prior art uses a driving frequency selection and a mutual capacitance driving and sensing to output multiple driving frequencies and accordingly determines the desired driving frequency. It is clear that the prior art has the disadvantages of requiring more time, consuming more power, and affecting the touch report rate.

The invention also uses the self capacitance driving and sensing to select the driving frequencies. When there is no noise interference in a normal operation, the system operates in the active mode in order to perform the mutual capacitance driving and sensing and obtain the 2D image raw data for a coordinate computation. Conversely, when there is noise interference, the system changes into the idle mode from the active mode in order to perform the self capacitance driving and sensing and output multiple driving frequencies. Thus, the statistic or filtering process can use the driving frequencies to find the most pure driving frequency as the active driving frequency, and subsequently the system returns to the active mode in order to perform the mutual capacitance driving and sensing and obtain the image raw data for calculating a coordinate or position of the touch point.

As cited, it is known that the driving frequency selection method for capacitive multi-touch systems can use the self capacitance driving and sensing technology, which can save the power without occupying the resources, to detect the most pure driving frequency when the capacitive multi-touch system 300 is in the idle/inactive mode. As soon as the most pure driving frequency is detected in the idle mode and configured into the active driving frequency, the capacitive multi-touch system 300 is changed into the active/normal mode in order to accurately detect the position of the touch point. In this case, the power consumption is reduced, and the system can be applied in portable devices to prolong the life of the portable devices. In addition, the problem of affecting the touch report rate caused by the large data amount in the prior art is also overcome.

Although the present invention has been explained in relation to its preferred embodiment, it is to be understood that many other possible modifications and variations can be made without departing from the spirit and scope of the invention as hereinafter claimed.

What is claimed is:

1. A driving frequency selection method for capacitive multi-touch system, which is used in a capacitive multi-touch system including a capacitive touch panel, a first driving and sensing device, a second driving and sensing device, and a controller, the first driving and sensing device and the second driving and sensing device each having an idle mode and an active mode and using N driving frequencies in the idle mode and the active mode, where N is a positive integer greater than one, wherein a self capacitance driving and sensing is performed when the first and second driving and sensing devices are in the idle mode, and a mutual capacitance driving and sensing is performed when the first and second driving and sensing devices are in the active mode, the driving frequency selection method comprising the steps of:

(A) using the controller to initialize the first and the second driving and sensing devices;

(B) using the controller to configure the first and the second driving and sensing devices into the active mode, and sequentially using the N driving frequencies to sense the capacitive touch panel to produce N mutual capacitance base image raw data to store in the storage unit;

(C) configuring the first and the second driving and sensing devices into the idle mode, and sequentially using the N driving frequencies to sense the capacitive touch panel to produce N self capacitance base image raw data to store in the storage unit;

(D) selecting one of the N driving frequencies as an active driving frequency;

(E) using the active driving frequency to sense the capacitive touch panel to produce a self capacitance image raw data to store in the storage unit;

(F) detecting a touch point on the capacitive touch panel according to the self capacitance image raw data and the self capacitance base image raw data, and executing step (G) when the touch point exists on the capacitive touch panel;

(G) configuring the first and the second driving and sensing devices into the active mode, and sensing the capacitive touch panel based on the active driving frequency to produce a mutual capacitance image raw data and store it in the storage unit;

(H) detecting a noise on the capacitive touch panel according to the mutual capacitance image raw data, and executing step (I) when there is no noise on the capacitive touch panel; and (I) calculating a coordinate of the touch point on the capacitive touch panel according to the mutual capacitance image raw data and the mutual capacitance base image raw data.

2. The driving frequency selection method as claimed in claim 1, further comprises, when the controller in step (H) determines that the noise exists on the capacitive touch panel, the steps of:

(J) sequentially using the N−1 driving frequencies other than the active driving frequency to sense the capacitive touch panel to produce N−1 self capacitance image raw data to store in the storage unit; and (K) using the controller to find one with a minimum noise from the N−1 self capacitance image raw data and configure the driving frequency corresponding to the self capacitance image raw data with the minimum noise into the active driving frequency, and executing step (G).

3. The driving frequency selection method as claimed in claim 2, wherein, when the controller in step (F) determines that there is no touch point on the capacitive touch panel, step (E) is executed.

4. The driving frequency selection method as claimed in claim 2, wherein step (J) further comprises the step of:

(J1) using the controller to configure the first and the second driving and sensing devices into the idle mode.

5. The driving frequency selection method as claimed in claim 1, wherein the controller in step (H) compares the mutual capacitance base image raw data and the mutual capacitance image raw data to detect the noise on the capacitive touch panel.

6. The driving frequency selection method as claimed in claim 1, wherein the controller in step (H) determines whether the noise exists on the capacitive touch panel based on whether one of the mutual capacitance image raw data is greater than a first threshold.

7. The driving frequency selection method as claimed in claim 1, wherein the controller in step (K) uses a statistic or filtering process to find the one with the minimum noise among the N−1 self capacitance image raw data.

8. The driving frequency selection method as claimed in claim 1, wherein step (F) compares the self capacitance image raw data in step (E) and the self capacitance base image raw data in step (C) to find a difference so as to determine whether the difference is over a first threshold, and step (F) determines that the touch point exists on the capacitive touch panel when the difference is over the first threshold, otherwise, there is no touch point when the difference is not over the first threshold.

9. The driving frequency selection method as claimed in claim 8, wherein a first trigger signal is produced to indicate that the touch point exists on the capacitive touch panel when an absolute value of a difference of data $P_{SCIRD}(i)$ and $P_{SCBIRD}(i)$ is greater than a first predetermined value, where i indicates a data range covered by the self capacitance image raw data and the self capacitance base image raw data, $P_{SCIRD}(i)$ indicates a value of the self capacitance image raw data, and $P_{SCBIRD}(i)$ indicates a value of the self capacitance base image raw data.

10. The driving frequency selection method as claimed in claim 9, wherein the self capacitance image raw data and the self capacitance base image raw data comprise a total data amount of m+n when the capacitive touch panel has m first conductor lines in a first direction and n second conductor line in a second direction, where i ranges from zero to (m+n−1).

11. The driving frequency selection method as claimed in claim 5, wherein step (H) further comprises the steps of:

(H1) producing a second trigger signal when an absolute value of a difference of data $P_{MCIRD}(k, j)$ and $P_{MCBIRD}(k, j)$ is greater than a second predetermined value, where k, j indicate an image range covered by the mutual capacitance image raw data and the mutual capacitance base image raw data, $P_{MCIRD}(k, j)$ indicates a value of the mutual capacitance image raw data, and $P_{MCBIRD}(k, j)$ indicates a value of the mutual capacitance base image raw data, and (H2) calculating a sum of the second trigger signals; and (H3) when the sum of the second trigger signals is greater than a third predetermined, the controller determining that the noise exists on the capacitive touch panel so as to indicate that the noise appears at many sensed positions.

12. The driving frequency selection method as claimed in claim 11, wherein the mutual capacitance image raw data and the mutual capacitance base image raw data comprise a total data amount of m×n when the capacitive touch panel has m first conductor lines in a first direction and n second conductor line in a second direction, where k ranges from zero to (m−1) and j ranges from zero to (n−1).

* * * * *